United States Patent

Hirst et al.

Patent Number: 5,079,910
Date of Patent: Jan. 14, 1992

[54] DEVICE FOR SEALING INSPECTION APERTURES

[75] Inventors: Roy T. Hirst, Derby; Gerard Sharkey, Burton on Trent, both of England

[73] Assignee: Rolls-Royce plc, London, England

[21] Appl. No.: 563,606

[22] Filed: Aug. 7, 1990

[30] Foreign Application Priority Data

Sep. 28, 1989 [GB] United Kingdom ............... 8921958

[51] Int. Cl.⁵ ............................................. F02G 1/00
[52] U.S. Cl. ................................. 60/39.33; 415/118
[58] Field of Search ............... 60/39.33; 415/118; 220/260, 254, 203, 373, 374, 209; 356/241; 137/551, 558, 559

[56] References Cited

U.S. PATENT DOCUMENTS

| 3,936,217 | 2/1976 | Travaglini et al. ............... 415/118 |
| 4,815,276 | 3/1989 | Hansel et al. |
| 4,825,642 | 5/1989 | Radtke |

FOREIGN PATENT DOCUMENTS

| 371261 | 4/1932 | United Kingdom |
| 527345 | 10/1940 | United Kingdom |
| 649321 | 1/1951 | United Kingdom |
| 2114268 | 8/1983 | United Kingdom |
| 2125522 | 3/1984 | United Kingdom |

Primary Examiner—Richard A. Bertsch
Assistant Examiner—Howard R. Richman
Attorney, Agent, or Firm—Oliff & Berridge

[57] ABSTRACT

A device (26) for sealing an inspection aperture in a casing (28) of a gas turbine engine (10) comprises a hollow housing (36) and a sealing plate (54). The housing (36) has an inspection aperture (40A) and a sealing ball (42). The sealing ball (42) moves along an arcuate track (45) formed on the housing (36) between a first position in which the sealing ball (42) seals against a conical seat (44) around the aperture (40A) and a second position in which the sealing ball (42) is displaced radially from the axis (52) of the inspection aperture (40A) to allow a borescope to be inserted therethrough. Normally the sealing plate (54), which has a cylindrical member (58), is arranged so that the cylindrical member (58) fits coaxially within and seals the aperture (40A). The sealing plate (54) is normally secured to the housing (36). If the sealing plate (54) is incorrectly refitted, the sealing ball (42) is arranged to move under gravity to the first position, and is held in this position in operation of the gas turbine by gas pressure.

7 Claims, 2 Drawing Sheets

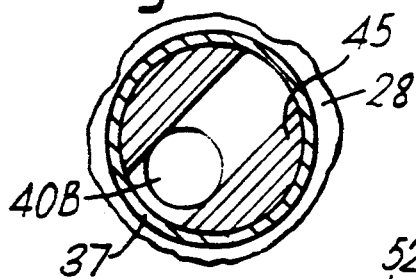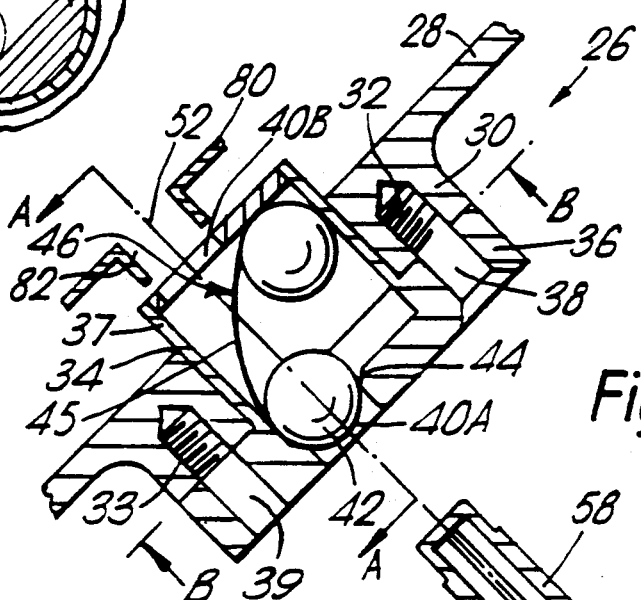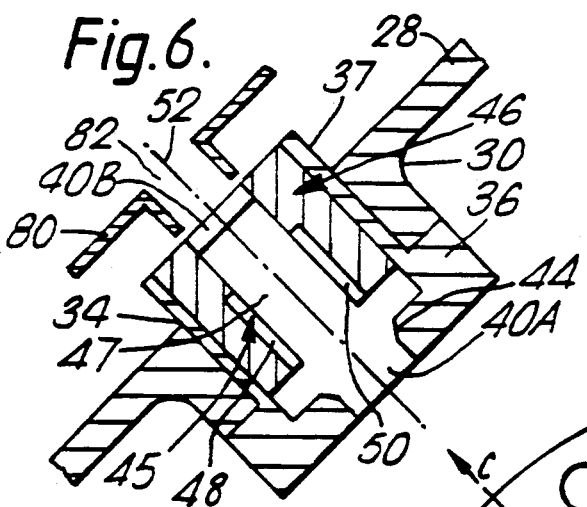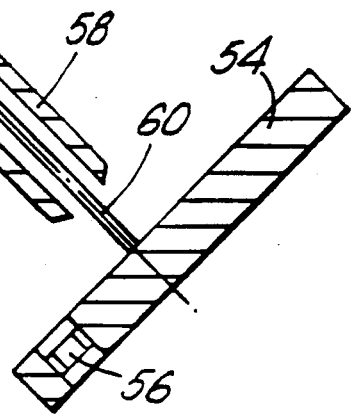

DEVICE FOR SEALING INSPECTION APERTURES

BACKGROUND OF THE INVENTION

The present invention relates to a device for sealing inspection apertures, and in particular to a device for sealing inspection apertures in a casing of a gas turbine engine.

Gas turbine engines generally comprise in flow series a compressor, a combustor and a turbine.

It is well known in the gas turbine engine art to inspect the compressor, combustor and turbine sections to assess the condition of the various components. Such inspection of the gas turbine engine comprises passing a viewing instrument through an inspection aperture in the casing of the gas turbine engine. The viewing instruments may be either flexible or rigid, and may be designed for end or angled viewing. The viewing instruments are commonly called borescopes. The viewing instruments allow cracking, wearing or other faults of the gas turbine engine components to be detected. The inspection aperture is commonly sealed by a sealing plate which is mechanically sealed to the gas turbine engine casing.

Unfortunately however it has been found that occasionally when the sealing plate has been removed from the gas turbine engine casing, to allow a borescope to be inserted through the inspection aperture to view engine components, the sealing plate has not been refitted, has been incorrectly refitted or has not been refitted to the correct tightness. The incorrect fitting, or refitting, of the sealing plate allows hot working gases to leak through the inspection aperture when the gas turbine engine is in operation. The leakage of the hot working gases, through the inspection aperture, may cause damage to encircling structure of the gas turbine engine or the relatively high temperature gases may cause any temperature/fire detectors to shut down the gas turbine engine during flight.

SUMMARY OF THE INVENTION

The present invention seeks to provide a device for sealing inspection apertures in which the aforementioned problems may be reduced or eliminated.

Accordingly the present invention provides a device for sealing inspection apertures comprising a housing having an inspection aperture therethrough, a sealing ball movable between a first position in which the center of the sealing ball is positioned on the axis of the aperture and the sealing ball seals against the sides of the aperture to prevent leakage of fluid through the inspection aperture, and a second position in which the center of the sealing ball is displaced from the axis of the inspection aperture by a distance sufficient to allow the insertion of an inspection instrument therethrough.

The housing may have a track to guide the sealing ball between the first position and the second position.

The housing may be arranged such that the sealing ball moves from the second position to the first position under the action of gravity.

The housing may have a spring to bias the sealing ball to the first position.

The track may be arcuate or comprise one or more straight portions.

A sealing plate may be removably secured to the housing, the sealing plate having a cylindrical member which is arranged to fit coaxially in the inspection aperture to move the sealing ball from the first position to the second position and to form a seal with the sides of the aperture.

BRIEF DESCRIPTION OF THE DRAWINGS

The present invention will be more fully described by way of reference to the accompanying drawings, in which:

FIG. 3 is an enlarged cross-sectional exploded view of a device for sealing an inspection aperture shown in FIG. 1.;

FIG. 4 is a view in the direction of arrow A in FIG. 3;

FIG. 5 is a view in the direction of arrows B in FIG. 3;

FIG. 6 is a cross-sectional view in the direction of arrow C in FIG. 5.

DESCRIPTION OF THE PREFERRED EMBODIMENT

Figure 1:
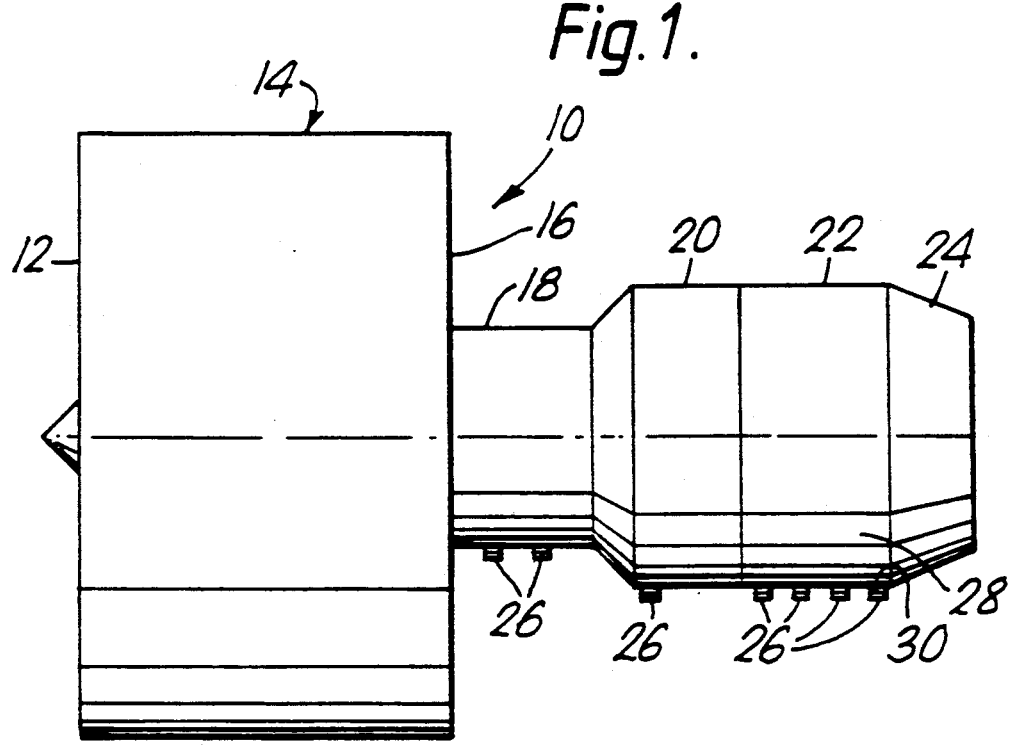
FIG. 1 is a side view of a turbofan gas turbine engine having a device for sealing an inspection aperture according to the present invention.

A turbofan gas turbine engine 10 is shown in FIG. 1 and comprises in axial flow series an inlet 12, a fan section 14, a compressor section 18, a combustion section 20, a turbine section 22 and an exhaust nozzle 24. The fan section 14 has a fan nozzle 16. The turbofan gas turbine engine 10 operates quite conventionally, in that air flowing into the inlet 12 is initially compressed by the fan section 14. This air is then divided, and a first portion of the air flows through the fan nozzle 16 to provide thrust. A second portion of the air flows through, and is further compressed by, the compressor section 18. The compressed air is supplied into the combustion section 20, where fuel is burnt in the compressed air to produce hot gases. The hot gases flow through, and drive, the turbine section 22 before passing through the exhaust nozzle 24 to atmosphere. The turbine section 22 drives the fan section 14 and compressor section 18 via shafts not shown.

Various components of the turbofan gas turbine engine 10 are inspected periodically by removal of one or more of a plurality of axially spaced sealing devices 26. The sealing devices 26 are normally sealed against bosses 30 of portions of the gas turbine engine casing 28.

Figure 2:
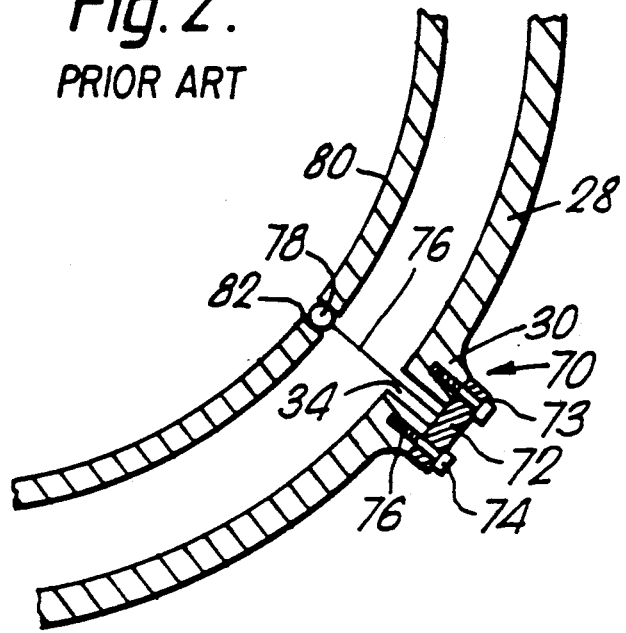
FIG. 2 is a cross-sectional view through a casing of a gas turbine engine having a prior art device for sealing an inspection aperture.

A prior art sealing device 70 is shown in FIG. 2. The sealing device 70 comprises a sealing plate 72 which is mechanically sealed against a boss 30 on the casing 28. The boss 30 has an inspection aperture 34 therethrough, to allow a borescope to be passed through the casing 30, so as to inspect components of the gas turbine engine 10. The sealing plate 72 is sealed against the boss 30 by tightening up a number of bolts 74, which pass through apertures 73 in the sealing plate 72 and into aligned threaded blind apertures 76 in the boss 30. The sealing plate 72 also has a resilient wire 76 which has an enlarged end 78. The wire 76 extends away from the plate 72 coaxially with the aperture 34. The enlarged end 78 is arranged to fit in an aperture 82 in an inner casing 80 to form a seal on the inner casing 80.

As discussed previously, if the sealing plate 72 is not refitted, or if the bolts 74 are not tightened sufficiently, hot gases are allowed to leak through the inspection aperture 34 when the gas turbine engine is operating.

A sealing device 26 according to the present invention is shown more clearly in FIGS. 3 to 6. The sealing device 26 comprises a housing 36 and a sealing plate 54. The housing 36 is permanently attached to a boss 30, by a number of screws (not shown) which pass through apertures 38 in the housing 36 and into aligned threaded blind apertures 32 in the boss 30. The aperture 34 in the boss is of increased size compared to the prior art to allow a portion 37 of the housing 36 to fit therein. The housing 36 is hollow and contains a sealing ball 42. The housing 36 has coaxial inspection apertures 40A and 40B in opposite sides of the housing 36. The inspection apertures 40A and 40B are of appropriate size to allow the passage of a borescope, or other viewing instrument, therethrough. The diameter of the sealing ball 42 is greater than the diameter of the apertures 40A and 40B so that when the sealing ball 42 lies over the aperture 40A a seal is formed. The inner surface of the housing 36 surrounding the aperture 40A is tapered to form a conical seat 44 for improved sealing with the sealing ball 42.

A guide member 46 is positioned within the housing 36, and the guide member 46 is arranged such that an aperture 47 through the guide member 46 is coaxial with the 52 of the inspection apertures 40A and 40B. The width of the aperture 47 is equal to the diameter of the apertures 40A and 40B. An arcuate track 45 is formed on the guide member 46 to guide movement of the sealing ball 42. The arcuate track 45 extends from one side of the aperture 47 to the diametrically opposite side of the aperture 47, and the arcuate track 45 has arcuate track portions 48 and 50, on either side of the aperture 47, on which the sealing ball 42 runs. The arcuate track portions 48 and 50 are parallel grooves cut into the guide member 46.

The arcuate track 45 has a portion, in the region of the inspection aperture 40A, which has a directional component initially substantially parallel to the axis 52 of the inspection aperture 40A. The directional component of the arcuate track 45 gradually increases its directional component in a direction radially of the axis 52 with increasing distance along the arcuate track from the inspection aperture 40A.

The sealing plate 54 has a resilient member 60 which has a cylindrical member 58 secured thereto. The outer diameter of the cylindrical member 58 is arranged to correspond to the internal diameter of the inspection apertures 40A,40B and the configuration of aperture 47.

The resilient member 60 and cylindrical member 58 are arranged to fit coaxially in the apertures 40A and 40B, during normal operation of the turbofan gas turbine engine, to seal the inspection apertures 40A and 40B. The sealing plate 54 is caused to seal against the housing 36 by tightening up a number of bolts (not shown), which pass through apertures 56 in the sealing plate 54, through aligned apertures 39 in the housing 36 and thread into blind apertures 33 in the boss 30.

When it is desired to inspect components of the gas turbine engine within the casing 28, the bolts holding the sealing plate 54 onto the boss 30 of the casing 28 are removed. The sealing plate 54 is then extracted by pulling the sealing plate 54 so that the resilient member 60 and cylindrical member 58 move coaxially out of the inspection apertures 40A and 40B.

While the cylindrical member 58 is being extracted from the inspection apertures 40A and 40B, the free end of the cylindrical member 58 moves gradually through the aperture 47 in the guide member 46. This allows the sealing ball 42 to start moving along the arcuate track 45 from a second position in which the center of the sealing ball 42 is displaced radially from the axis 52 of the inspection apertures 40A by a distance sufficient to allow the cylindrical member 58 to pass through the apertures 40A,40B to a first position in which the center of the sealing ball 42 is positioned on the axis 52 of the inspection aperture 40A and seals against the conical seat 44 around the aperture 40A.

The viewing end of a borescope is aligned with the inspection aperture 40A, and is pushed into the aperture 40A. The sealing ball 42 is pushed by the borescope and guided by the arcuate track 45. The sealing ball 42 moves from the first position in which the center of the sealing ball 42 is positioned on the axis 52 of the aperture 40A and seals against the conical seat 44 around the aperture 40A, to the second position in which the sealing ball is displaced radially from the axis 52 of the aperture 40A by a distance sufficient to allow the borescope to pass through the apertures 40A and 40B to inspect the engine components. The gradual change in the directional component along the arcuate track allows the sealing ball to be moved easily by the borescope.

On withdrawal of the borescope from the inspection apertures 40A and 40B, the sealing ball moves down the arcuate track 45 to the first position to seal against the conical seat 44 around the aperture 40A.

If, after completion of inspection of the turbofan gas turbine engine, the sealing plate 54 is not refitted, the inspection aperture 40A is automatically sealed by the sealing ball 42 resting against the conical seat 44 around the aperture 40A. If the turbofan gas turbine engine is subsequently operated without the sealing plate 54 in position, the pressure of the got gases flowing through inspection aperture 40B into the housing 36 act on the sealing ball 42 to firmly seal the inspection aperture 40A.

Similarly if the sealing plate 54 is incorrectly fitted in the inspection aperture 40A and the sealing plate 54 falls out of the inspection aperture 40A, the inspection aperture 40A is automatically sealed by the sealing ball 42.

The inspection apertures are commonly arranged in the lower half of the casing of the gas turbine engine for ease of access. In such circumstances the housing 36, guide member 46 and guide track are arranged so that the sealing ball 42 is biased from the second position to the first position under the action of gravity i.e. the ball is arranged at a higher elevation in the second position than the first position. The arcuate track may be arranged to lie in a vertical plane. If inspection apertures are arranged in the upper half of the casing a spring is provided so that the sealing ball 42 is biased from the second position to the first position.

Although the description has referred to the guide member having an arcuate track to guide the sealing ball, it may be equally practical to use a straight track or two or more straight track portions arranged at differing angles depending upon the particular circumstances.

The device for sealing inspection apertures may be used for inspection apertures in steam turbine engines, internal combustion engines, other structures or machines in which inspection apertures are provided to allow the inspection of internal components or structures.

We claim:

1. A device for sealing inspection apertures provided in a casing, comprising:

a housing having an inspection aperture therethrough; a sealing ball being located in the housing, the sealing ball being movable between a first position in which the center of the sealing ball is positioned on the axis of the aperture and the sealing ball seals against the sides of the aperture to prevent leakage of fluid through the inspection aperture, and a second position in which the center of the sealing ball is displaced from the axis of the inspection aperture by a distance sufficient to allow the unobstructed insertion of an inspection instrument therethrough; and means for biasing the sealing ball to the first position.

2. A device as claimed in claim 1 in which the housing has a track to guide the sealing ball between the first position and the second position.

3. A device as claimed in claim 1 in which the housing is mounted on a lower portion of the casing such that the means for biasing the sealing ball and moving the sealing ball from the second position to the first position is gravity.

4. A device as claimed in claim 1 in which the housing has a spring to bias the sealing ball to the first position.

5. A device as claimed in claim 2 in which the track is arcuate.

6. A device as claimed in claim 2 in which the track comprises at least one straight portion.

7. A device as claimed in claim 1 in which a sealing plate is removably secured to the housing, the sealing plate having flexibly attached there at a cylindrical member which is arranged to fit coaxially in the inspection aperture to move the sealing ball from the first position to the second position and to form a seal with the sides of the aperture.

* * * * *